FIG. 1.

INVENTOR.
Cletus J. Collom.
BY
Harness, Dickey & Pierce
ATTORNEYS.

United States Patent Office 2,878,364
Patented Mar. 17, 1959

2,878,364

ELECTRONIC CONTROL SYSTEM

Cletus J. Collom, Southfield Township, Oakland County, Mich., assignor to Weltronic Company, Detroit, Mich., a corporation of Michigan Continuation of application Serial No. 216,621, March 20, 1951. This application May 28, 1952, Serial No. 290,550

48 Claims. (Cl. 219—114)

This invention relates generally to electronic control systems and more specifically to such electronic sequencing networks which are adapted, among other uses, for controlling the sequence of operations of a welding apparatus and is a continuation of my copending application, Serial No. 216,621, filed March 20, 1951, for Electronic Control System, now abandoned.

Considerable difficulty has been experienced with welding machines, in which the welding current is supplied to the electrodes directly from the power supply line under control of a switching mechanism, in the event of a failure of a vital circuit element which often results in the continued application of the flow of welding current with the consequent destruction of the workpiece and damage to the electrodes. Also difficulty has been experienced in obtaining high speed welding due to the inherent sluggishness of the fluid ram, since such sluggishness reduces the maximum rate of making weld spots of which the machine would otherwise be capable.

It is therefore an object of this invention to provide a new sequencing network which will overcome the above described deficiencies.

Another object of this invention is to provide such a device which is simple in operation and which is easily and economically manufactured.

Another object of this invention is to provide such a device which, in the event of the failure of one or more of its component parts, will not result in a lengthened heating or welding current supplying period.

Another object of this invention is to provide a network in which the welding or heating time period is controlled by the time required to discharge a chargeable element into a discharging network.

Another object of this invention is to provide such a network in which means is provided to prevent simultaneous connection of the chargeable device with its charging source and with its discharging network.

Another object of this invention is to provide such a network in which a single pole double throw switch in one position connects the chargeable element to a source of charging current and in a second position disconnects the chargeable element from the source and connects it to the discharging network.

Another object of this invention is to provide such a sequencing network in which the hold time interval is initiated concurrently with the initiaion of the weld interval.

Other objects of the invention will be apparent from the specification, the appended claims, and the drawings, in which drawings:

Generically, the invention contemplates a timing network using a minimum number of electronic control valves arranged in alternate relation between a pair of energizable conductors and so arranged that the conductivity of the various valves is controlled in sequence by means of chargeable elements discharging through their respective discharge circuits. In one form of the invention, the one of the chargeable elements controlling the application of the energizing current for the electrodes is arranged so that it is operative to provide for a flow of energizing current to the electrodes solely during a discharging period thereof and is provided with switching means which prevents the simultaneous connection of such element to its charging circuit and to its discharging circuit.

In another form of the invention the timing function of the chargeable element controlling the outward movement of the electrodes from the workpieces is controlled, not as a consequence of the completion of the flow of electrode current, but as a consequence of the initiation of the flow of electrode current. This new arrangement enables me to correlate the timing of the initiation of the electrode releasing circuit with the inherent sluggish characteristics of the electrode actuating ram so that electrodes may be withdrawn at the earliest possible moment subsequent to completion of the weld spot. I have found that in many instances it is desirable, in the interests of increasing the capacity of the welding machine, to release as much as fifty percent of the initial pressure exerted by the electrodes at the beginning of the welding interval by the time the welding current flow is terminated.

Figure 1:
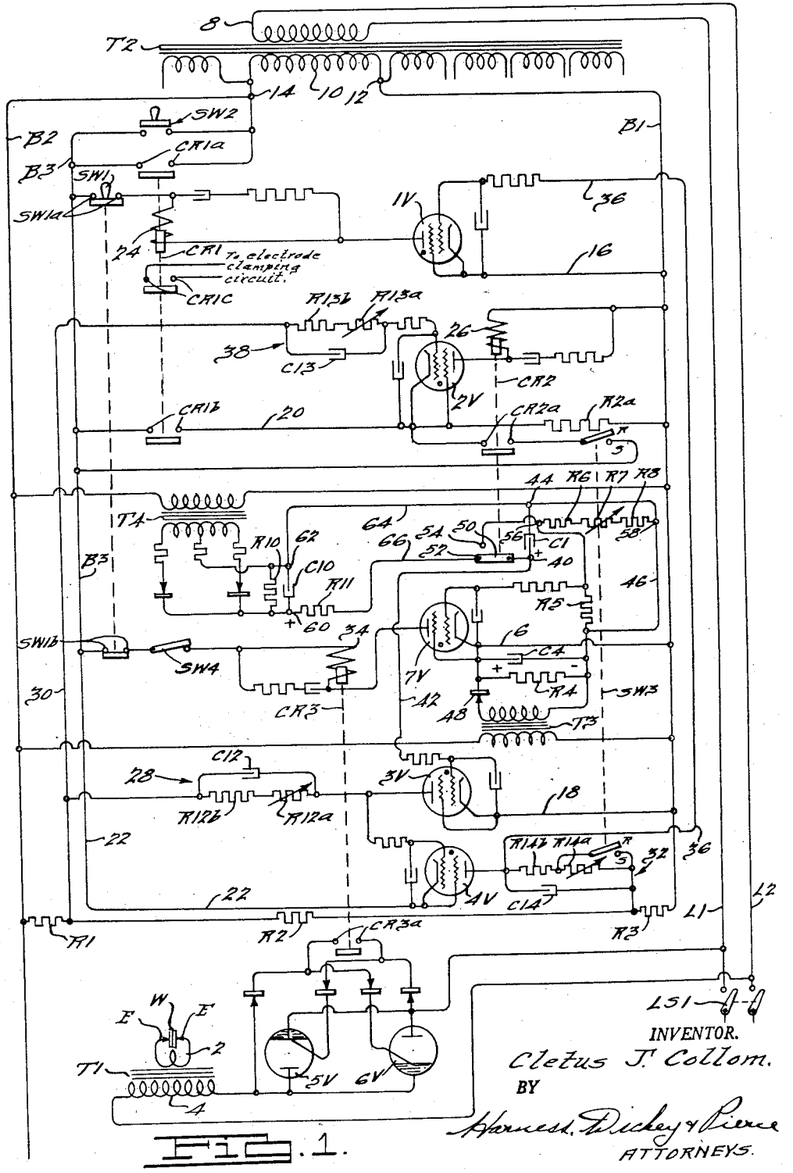
Figure 1 is a schematic view of a sequencing network embodying certain features of the invention.

Referring to the drawings, and more specifically to Fig. 1, the sequencing network shown therein comprises a plurality of valves 1V, 2V, 3V and 4V which act in accordance with their conductivity to control the various timing functions of a welding machine shown diagrammatically as comprising the welding transformer T1 having a secondary winding 2 connected to supply electrical energy to a pair of welding electrodes E which may be clamped against a workpiece W. Electrical energy is supplied to the primary winding 4 of the transformer T1 under control of a pair of back-to-back electric valves 5V, 6V from a pair of electrical lines L1, L2 which may be energized from a suitable source of alternating current through the line switch LS1.

The valves 5V and 6V are shown as being of the ignitron type which are rendered conductive by the application of a critical potential betwen their igniters and cathodes. The igniter circuit may take many forms and is here shown as comprising a network in which the critical voltage applied between the igniter and cathode is derived from the voltage appearing between the anode and cathode of the ignitron so that when the tube has commenced to conduct, most of the igniter voltage will be removed. The igniter circuit also includes a plurality of rectifying units polarized to apply the critical voltage to the igniter element only when the proper polarity of voltage is placed between the anode and cathode of the valve 5V or 6V. The circuit also includes the normally open contacts CR3a of a relay CR3 controlled by means of a valve 7V. The contacts CR3a, when in open circuit position, break the circuit between the respective anodes of the valves 5V and 6V and the igniters thereof so that the valves 5V and 6V are rendered conductive solely during periods in which the relay CR3 is energized closing its normally open contacts CR3a.

A transformer T2 has a primary winding 8 connected to the lines L1, L2 and a secondary winding 10 having one terminal 12 connected to a bus B1 and a second terminal 14 connected to a bus B2. A third bus B3 is selectively connected to the terminal 14 and bus B2 by means of the normally open manually operable switch SW2 and the normally open contacts CR1a of the control relay CR1. The valves 1V and 4V are arranged in alternate polarity between the terminals 12 and 14, the cathodes of the valves 1V and 3V being connected to the bus B1 by means of conductors 16 and 18 and the cathodes of the valves 2V and 4V being connected to the bus B3 by the conductors 20 and 22. The anode of the valve 1V is connected through the energizing winding 24 of the relay CR1 and the normally closed contacts SW1a of the emergency stop switch SW1. The anode of the valve 2V is connected through the energizing winding 26 of a control relay CR2 to the bus B1. The anode of the valve 3V is connected through an impedance network 28 to a conductor 30. This conductor 30 is connected to the common point between the resistors R1 and R2 and through the resistor R1 to the bus B2. The anode of the valve 4V is connected through an impedance network 32 to the common point between the resistors R2 and R3 and through the resistor R3 to the bus B1. The cathode of the valve 7V is connected through the conductor 6 to the bus B1 and its anode is connected through the energizing winding 34 of the relay CR3, a manually operable weld-no-weld switch SW3, and the normally closed contacts SW1b of the emergency stop switch SW1 to the bus B3. Each of the valves 1V, 2V, 3V, 4V and 7V are of the type in which initiation of conduction between the anode and cathode thereof is controlled by means of a control potential placed between the control grid and cathode thereof but which when once having become conductive will continue to conduct irrespective of the magnitude of this control potential.

The grid of the valve 1V is connected through a current limiting resistor and conductor 36 to the anode of the valve 4V whereby the potential appearing across the network 32 and across the resistor R3 will be applied between the grid and cathode of the valve 1V. The grid of the valve 2V is connected through a grid current limiting resistor and an impedance network 38 to the conductor 30 which is connected to the bus B2 through the resistor R1. The grid of the valve 4V is connected through a grid current limiting resistor to the anode of the valve 3V so that the potential appearing across the network 28 and across the resistor R1 will be applied as a controlling bias voltage between the grid and cathode of the valve 4V during periods in which the bus B3 is connected to the bus B2.

The grid to cathode bias voltages of the valves 3V and 7V is derived from the capacitor C1. The positive terminal 40 of the capacitor C1 is directly connected by the conductor 42 through a grid current limiting resistor to the grid of the valve 3V. The negative terminal 44 of the capacitor C1 is connected to the cathodes of the valves V3 and V7 by conductor 46, resistor R4, the conductor 6, bus B1, and conductor 18. The potential appearing across the capacitor C1 is polarized to bias the valves 3V and 7V toward conductive condition. The potential appearing across the resistor R4 and capacitor C4 connected in parallel therewith is derived from a transformer T3 which is connected thereto through a rectifying element 48 so that the potential appearing across the resistor R4 and capacitor C4 will be of unidirectional and substantially constant value. It is polarized to urge the grid of the valves 3V and 7V negative with respect to their cathodes. The controlling grid of the valve 7V is connected through the usual grid current limiting resistor, resistor R5 and resistor R4 to the conductor 6.

Resistor R5 is connected in parallel with the series connected resistance elements R6, R7 and R8 and the potential thereacross will exist and it will be effective to exert a biasing influence on valve 7V only during the discharging period of the capacitor C1. As shown, the resistance of element R7 is of variable magnitude so that the total resistance of the resistors R6 through R8 may be varied. It should be appreciated that a single resistor or any combination of variable and fixed resistors might be substituted for the resistors R6, R7 and R8.

The discharging and charging of the capacitor C1 is dependent upon the position of a single pole double throw switch actuated by the control relay CR2. The single pole double throw switch comprises a switch arm 50 which is in engagement with a contact 52 when the winding 26 is de-energized and is engageable with a second contact 54 when the winding 26 is energized. The spacing of the contacts 52 and 54 with respect to the arm 50 is such that the arm cannot engage both of these contacts at the same time. The common connection 56 of the resistors R5 and R6 is connected to contact 54 and the common connection 58 of the resistors R5 and R8 is connected to the negative terminal 44 of the capacitor C1. The positive terminal 40 of the capacitor C1 is connected to the arm 50. Therefore, when the capacitor C1 is in a charged condition and the arm 50 is moved into engagement with the contact 54, the capacitor C1 will discharge through the resistors R5, R6, R7 and R8 establishing a potential across the resistor R5 which is in a polarity to oppose the potential established across the resistor R4. During a portion of this discharge the potential across R5 is greater than that across R4 and the valve 7V is rendered conductive. As the charge across the capacitor C1 decreases so will the potential across the resistor R5 and eventually it will decrease sufficiently so that the blocking potential appearing across the resistor R4 will again block the valve 7V and it will fail to conduct during the next subsequent half cycle in which the bus B3 is positive with respect to the bus B1. The relay CR3 therefore becomes de-energized and terminates the flow of electrical energy to the transformer T1.

The network for charging the capacitor C1 derives its energy from transformer T4 having a primary winding connected between the busses B1 and B2 and having a center tapped secondary winding. The end terminals of this secondary winding are connected through suitable rectifiers and current limiting resistors to the positive terminal 60 of the direct current charging network. The center tap of this winding is connected through a resistor to the negative terminal of the charging network. A resistor capacitor combination R10, C10 connected between terminals 60 and 62 acts to provide a relatively constant direct current potential between the terminals 60 and 62. The negative terminal 62 is continually connected to terminal 44 of the capacitor C1 by conductor 64. The terminal 60 is selectively connected with capacitor C1 through a charging current limiting resistor R11 and conductor 66, the conductor 66 being connected to the contact 52 and the arm 50 being connected to condenser terminal 40. Therefore with the relay CR2 de-energized, the capacitor will be connected to the terminals 60 and 62 for charging the capacitor C1. With the relay CR2 energized, the charging circuit will be broken due to movement of the arm 50 out of electrical engagement with the contact 52 and the discharge circuit for the capacitor C1 will be completed due to electrical making contact of the arm 50 with the contact 54.

It is believed that the remainder of the details of the construction of Fig. 1 may best be understood by a description of operation of this figure which is as follows:

The system of Fig. 1 is prepared for operation by closing the line switch LS1 whereby the lines L1 and L2 are energized with an alternating potential. Energization of the lines L1 and L2, energizes the primary winding 8 of the transformer T2 causing its secondary winding 10 to apply an alternating potential between the terminals 12 and 14 which is applied to the busses B1 and B2. Upon energization of the busses B1 and B2, the transformer T4 of the charging network is energized and charges the timing capacitor C1. The transformer T3 is energized to establish a potential across the resistor and capacitor R4, C4 which places a blocking bias voltage on the valve 7V holding this valve in a nonconductive condition. The charge across the capacitor C1 will be reflected as positive grid to cathode bias voltage on the valve 3V overcoming the blocking bias voltage applied thereto by the resistor capacitor R4, C4 to render the valve 3V conductive to conduct current from the bus B2 through the resistor R1, conductor 30, the impedance network 28, the valve 3V and conductor 18 to the bus B1. This establishes a potential across the capacitor C12 having in parallel circuit therewith the resistors R12a and R12b. The potential across this network 28 is not yet applied between the grid and cathode of the valve 4V due to the now open condition of the switch SW2 and of the contacts CR1a but since these same switches and contacts interrupt the anode to cathode circuit of the valve 4V, it will not conduct. During this initial period, the capacitor C13 of the impedance network 38 will charge due to grid conduction of the valve 2V, the circuit being from the bus B2 through the resistor R1, conductor 30, network 38, grid to cathode within the valve 2V and the resistor R2 to the bus B1. The network 38, like the network 28, is provided with series connected resistors R13a and R13b connected in parallel with the capacitor C13.

When it is desired to initiate a welding sequence, the normally open start switch SW2 is momentarily closed whereby the bus B3 is connected to the terminal 14 and bus B2. Upon connection of the busses B2 and B3, the potential which was established across the network 28 will be applied in blocking polarity between the grid and cathode of the valve 4V biasing this valve to a nonconductive condition to prevent its conduction upon closure of its anode to cathode circuit. Energization of the bus B3 does, however, complete the anode to cathode circuit for the valve 1V. Since valve 4V is nonconductive and there is no potential across network 32, the valve 1V will conduct and current will then flow from the bus B3 through the normally closed contacts SW1a, the coil 24 of the relay CR1, the valve 1V, and the conductor 16 to the bus B1 thereby closing the normally open contacts CR1a, CR1b and CR1c of the relay CR1.

Closure of the contacts CR1a establishes a holding circuit by-passing the switch SW2 which may then be opened without interrupting the complete sequencing operation of the sequencing network. Closure of the contacts CR1c establishes a local circuit, as indicated, to energize the clamping circuit for causing the electrodes E to move against the work W. This local circuit is of the usual type and for the interests of simplicity is not further shown herein. Closure of the contacts CR1b connects the cathode of the valve 2V to the bus B3 whereby its potential, which formerly was nearly that of the bus B1 due to its connection thereto through the resistor R2a, is brought the same potential as that of the bus B3. This change in potential of the cathode of the valve 2V terminates further charging current flow to the capacitor C13 of the network 38 and the capacitor C13 will then commence to discharge through the resistors R13a and R13b. The resistor R13a is shown herein as being adjustable so that the discharge rate of the capacitor C13 may be varied within desired limits. In this regard it should be understood that the resistors R13a and R13b as well as the corresponding resistors of the networks 28 and 32 could be a single variable resistor or a combination of variable and/or fixed resistors depending upon the degree of adjustability desired for the discharge time of the associated capacitor.

During the charging time of the capacitor C13 of the network 38, a potential will be built up across the capacitor C13 so that its terminal nearest the grid will be positive with respect to the terminal connected to the conductor 30. Closure of the contacts CR1b effectively connects the positive terminal of the capacitor C13 to the cathode of the valve 2V in a circuit which includes the resistor R1, the bus B2, the contacts CR1a, the bus B3 and the conductor 20. At the end of a predetermined time, generally delineated in the art as squeeze time, which time is sufficient for the electrodes E to firmly clamp the work W, the charge across the capacitor C13 will have decreased sufficiently so that its potential when combined with the positive potential across the resistor R1 will bias the grid of the valve 2V sufficiently with respect to the respective cathode to permit valve 2V to conduct.

Conduction of the valve 2V establishes a circuit from the bus B1 through the winding 26 of the relay CR2, the valve 2V, conductor 20 and the closed contacts CR1b to the bus B3. The relay CR2, so energized, moves its arm 50 out of engagement with the contact 52 and into engagement with the contact 54 disconnecting the capacitor C1 from the charging network and connecting it to the resistors R5, R6, R7 and R8 to discharge this capacitor C1 at a controlled rate. The rate of discharge of the capacitor C1 is shown as being controlled by the variable resistor R7. The potential appearing across the resistor R5 opposes the blocking potential appearing across the resistor R4 and the resulting grid to cathode bias of the valve 7V will permit this valve to conduct.

Conduction of the valve 7V establishes a circuit from the bus B3 through the closed contacts SW1b, the closed weld-no-weld switch SW4, the coil 34 of the control relay CR3, valve 7V and conductor 6 to the bus B1. Energization of the coil 34 closes the contacts CR3a thereby energizing the circuits for the igniters for the ignitron valves 5V and 6V rendering them effective to energize the transformer T1 with alternating current from the lines L1 and l2. Energizing of the transformer T1 will energize the secondary winding 2 causing current to flow between the electrodes E through the work W.

At the end of a predetermined time, the charge across the capacitor C1 will have decreased sufficiently so that the blocking bias furnished by the resistor R4 and capacitor C4 will overcome the unblocking bias across the resistor R5 and the valve 7V will become nonconductive. The bias applied between the grid and cathode of the valve 3V tending to render the valve conductive is also derived from the capacitor C1 and since the valve 3V preferably has the same characteristics as the valve 7V, the valve 3V will become blocked at substantially the same time as the valve 7V to terminate further flow of current to the network 28. The capacitor C12 of this network then commences to discharge through its discharge resistors R12a and R12b until such time as the unblocking bias voltage afforded by the resistor R1 overcomes the blocking bias voltage afforded by network 28 at which time the valve 4V will be rendered conductive. The discharge time of the network 28 is known as "hold time" or the time during which the electrodes E will be held against the work W subsequent to the termination of the flow of welding current.

Upon timing out of the network 28 and conduction of the valve 4V, a circuit is established from the bus B1 through the resistor R3, the network 32, the valve 4V, and conductor 22 to the bus B3 thereby establishing a potential across the network 32 which is applied by means of the conductor 36, bus B1, and conductor 16 between the grid and cathode of the valve 1V to terminate further flow of current therethrough and de-energizing the relay CR1. Its contacts CR1c then open to de-energize the electrode clamping circuit and permit the electrodes E to separate from the work W.

It will be observed that, with this sequence arrangement in which the valve 3V cannot become blocked prior to the end of the time period during which welding current flows between the electrodes, the electrode clamping circuit cannot be de-energized to permit the start of the movement of the electrodes E from the work W, until at the very earliest, concurrently with the termination of the welding current flow. In many instances this arrangement is desirable especially in low rate of production application.

If now the switch SW2 has been opened, the de-energization of the relay CR1 and the opening of the contacts CR1a will terminate a welding cycle and a subsequent welding cycle may be initiated by subsequent closure of the switch SW2 to cause a subsequent sequence of the operation substantially as described, providing however that sufficient time has elapsed to permit the capacitor C14 to discharge through the resistors R14a and R14b. If, however, the switch SW2 has been maintained closed, a subsequent cycle will result at the end of the discharge time of the capacitor C14, for then the valve 1V will immediately reconduct energizing the relay CR1.

The above described sequence of operation prevails when the single-repeat weld switch SW3 is in the "R" position as shown. If it is not desired to have the sequencing network make repeated welds as long as the pilot switch SW2 is closed, the switch SW3 is moved from its shown "R" position to the "S" position. The switch SW3 then completes a by-pass circuit around the contacts CR1b under control of the contacts CR2a so that upon closure of these contacts such by-pass circuit is established. Subsequent opening of the contacts CR1b due to blocking of the valve 1V will not terminate the conduction through the valve 2V and energization of the relay CR2. As long as the relay CR2 is maintained energized, the charging circuit is ineffective to again recharge the capacitor C1 and the valve 3V and 7V are maintained blocked under the influence of the blocking bias voltage established across the resistor R4.

As long as the valve 3V is blocked, the valve 4V will remain conductive, assuming the switch SW2 is maintained closed, and the valve 7V will remain blocked preventing further energization of the transformer T1. Opening of the switch SW2 acts to interrupt the anode-cathode circuits for the valves 2V and 4V to de-energize the relay CR2 which permits the arm 50 to again engage the contact 52 for recharging the capacitor C1 and to de-energize the network 32 whereby the network will revert back to its initial condition of operation.

The switch SW3 also establishe a by-pass circuit about the resistor R14a so that upon termination of current flow through the valve 4V, the capacitor C14 will rapidly discharge through the resistor R14b for substantially eliminating the "off time" normally afforded by the network 32. Subsequent reclosure of the switch SW2 will cause a subsequent sequence of operation of the network substantially as described above.

Figure 2:
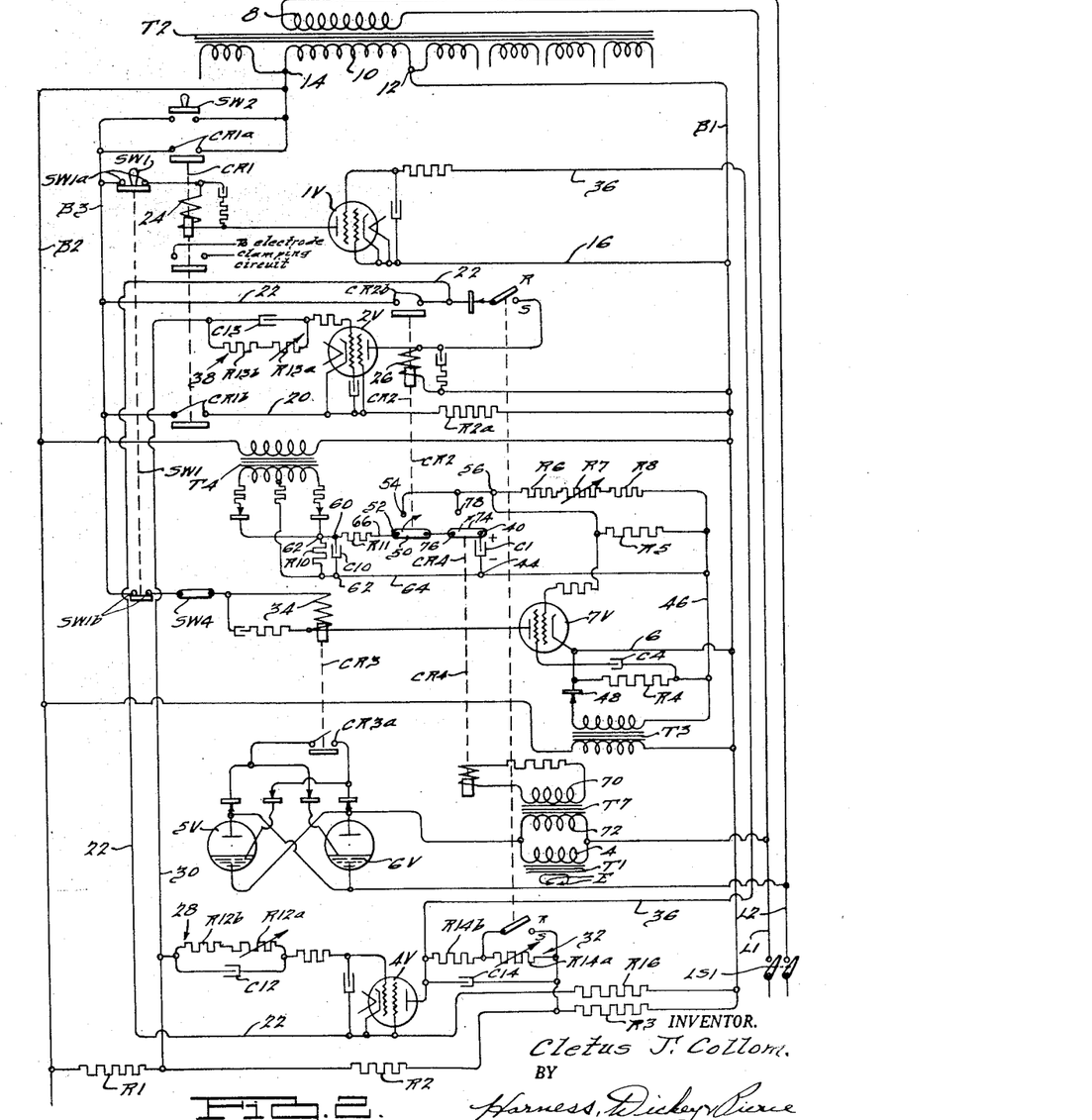
Fig. 2 is a schematic view of a modified form of the sequencing network showing other features of the invention.

In Fig. 2, there is shown a modified form of network similar to that shown in Fig. 1 except that the circuit for initiating the removal of the electrodes from the workpiece, commonly known as the hold time network, is initiated concurrently with the initiation of the flow of welding current. This modification also eliminates the valve 3V of Fig. 1 and charges the hold time network 28 by means of grid rectification in the valve 4V. Also there is provided an additional relay CR4 connected to be energized in accordance with the voltage appearing across the welding transformer T1.

More specifically, in Fig. 2, the relay CR2 is provided with a pair of contacts CR2b inserted in the conductor 22 connecting the cathode of the valve 4V to the bus B3 whereby the connection of the cathode of the valve 4V to the bus B3 is under control of the relay CR2. The cathode of the valve 4V is continually connected to the bus B1 through a resistor R16. With the cathode so connected it may be shifted in potential from that approximating the bus B1 during the interval that the contacts CR2b are open and to that of the bus B3 during the intervals that the contacts CR2b are closed.

The hold time network 28 is connected to the bus B2 through a resistor R1. Therefore during the intervals in which the contacts CR2b are open, the network 28 will be charged through a circuit which extends from the bus B2 through the resistor R1, conductor 30, network 28, grid to cathode rectification in the valve 4V, and resistor R16 to the bus B1. As in Fig. 1, the left-hand terminal of the network 28 is connected to the bus B3 during the time intervals that either the switch SW2 or the contacts CR1a are closed but in this form it is connected to the cathode of valve 4V only when, in addition, contacts CR2a are closed. This circuit extends from the left-hand terminal of the network 28 through the conductor 30, resistor R1, bus B2, the switch SW2 or the contacts CR1a, the bus B3 and conductor 22, and contacts CR2b to the cathode of valve 4V.

Upon conduction of the valve 2V, the relay CR2 will be energized and move arm 50 out of engagement with the contact 52 and into engagement with the contact 54 for connecting the capacitor C1 across the resistors R5, R6, R7 and R8. The valve 7V then conducts, energizing the relay CR3 to initiate conduction of the valves 5V and 6V. The same energization of the relay CR2 to initiate energization of the welding transformer T1 also completes the anode-cathode circuit of valve 4V as well as completing the circuit between the left-hand terminal of the network 28 and the cathode of the valve 4V to place the blocking bias potential afforded by the network 28 between the grid and cathode of the valve 4V whereby the valve 4V is maintained nonconducting. At the end of a predetermined time interval, determined by the rate of discharge of the capacitor C12 through the resistors R12a and R12b, the capacitor C12 will discharge sufficiently so that the conducting bias afforded by resistor R1 will cause the valve 4V to conduct. Since the timing out of the network 28 starts upon closure of contacts CR2b, it is apparent that the initiation of the timing function of the network 28 occurs at substantially the same time as the initiation of the flow of welding current and a proper adjustment of R12a will permit conduction of valve 4V either before, concurrently with, or after timing out of the capacitor C1.

Upon timing out of the network 28, the valve 4V will conduct to energize the "off time" network 32 for applying a grid to cathode blocking bias potential on the valve 1V in a manner similar to that of Fig. 1 thereby de-energizing the relay CR1 which opens its contacts CR1a and CR1b. Opening of the contacts CR1b will open the circuit through the valve 2V and de-energize the relay CR2 whereby its contacts CR2b open and its arm 50 moves out of engagement with the contact 54 and into engagement with the contact 52. In the form shown in Fig. 1 such movement of the arm 50 would disconnect the capacitor C1 from its discharge resistors R5 through R8 thereby blocking the valve 7V and terminating further flow of current to the welding transformer T1. Under such conditions, the length of welding time would be controlled by the first to time out of the capacitor C1 and the network 28.

In order to maintain the valve 7V conductive in response to the timing out of capacitor C1 irrespective of a prior timing out of the network 28, an additional relay CR4 is provided. The relay CR4 has its energizing winding connected across the primary winding 70 of a transformer T7 which has its primary winding 72 connected across the primary winding 4 of the transformer T1. Therefore upon energization of the transformer T1, the relay CR4 will be energized to move its contact arm 74 out of engagement with contact 76 and into engagement with contact 78. The contact 78 is directly connected to the terminal 56 and the arm 74 is connected to the positive terminal 40 of the capacitor C1. The contact 76 is connected to the arm 50. Energization of the relay CR4 thereby reconnects the terminal 40 to the terminal 56 so that the connection is unaffected by the position of the arm 50 of the relay CR2. With this arrangement, timing out of the network 28 and consequent de-energization of the relay CR2 will not effect the conductive time of the valve 7V which will continue to be controlled by the discharge time of the capacitor C1. Upon timing out of the capacitor C1 and blocking of the valve 7V to terminate flow of welding current to the transformer T1, the relay CR4, effectively connected in parallel with the transformer T1, will be de-energized whereby the arm 74 is moved out of engagement with contact 78 and into engagement with contact 76 to reconnect the terminal 40 to the switch arm 50 for recharging the capacitor C1 from the conductors 64 and 66.

Figure 3:
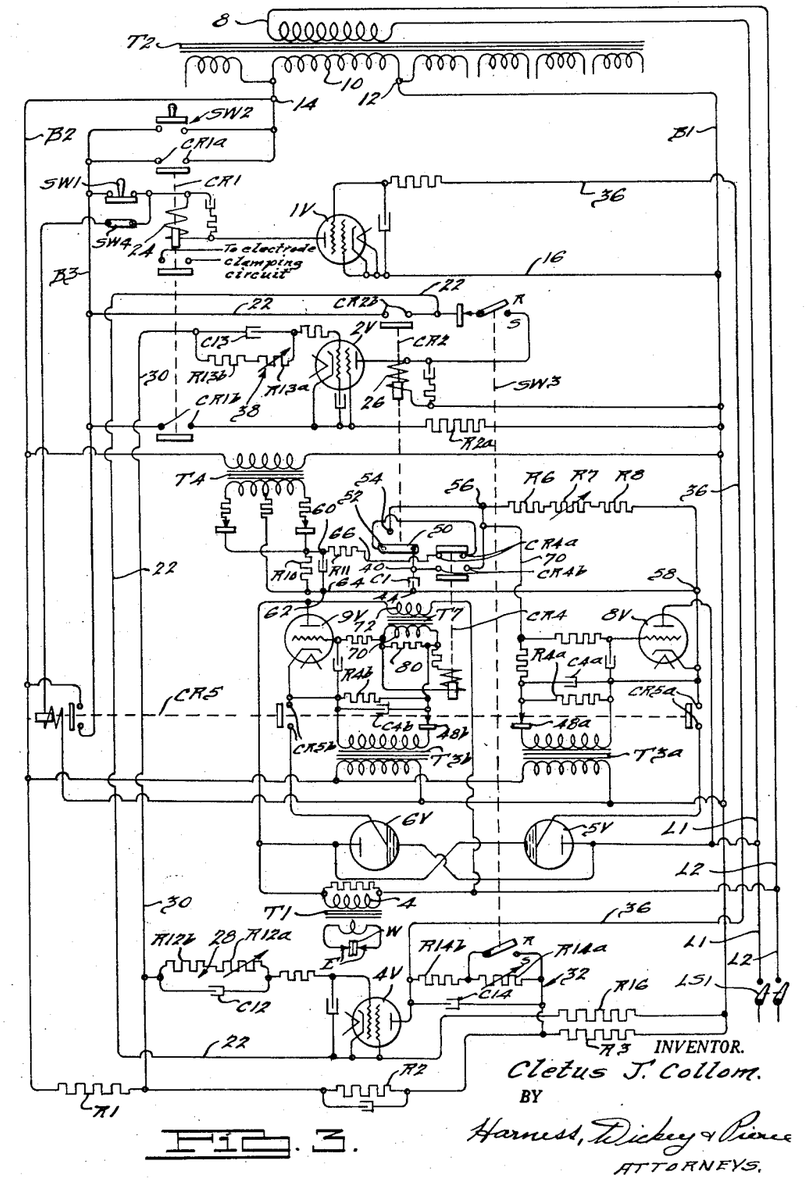
Fig. 3 is a schematic view of a still further modified sequencing network illustrating other features of the invention.

In Fig. 3 there is shown a further modified form of timing network which is very similar to that of Fig. 2 in that it uses current rectification in the valve 4V for charging the hold time network 28 which is set to commence its timing function concurrently with the initiation of the flow of current to the welding transformer T1. In this figure, however, the valves 5V and 6V are controlled by a pair of valves 8V and 9V, the valve 8V in many respects corresponding to the valve 7V in that its conduction is controlled by means of the grid-to-cathode bias placed thereon by means of the capacitor C1. The valve 9V is arranged to trail the valve 8V and will conduct each subsequent half cycle to the half cycle in which the valve 8V conducts.

Both the valves 8V and 9V are normally maintained non-conductive by means of a direct current potential placed thereon by the transformers T3a and T3b. The potential appearing between the terminals 56 and 58 supplied by the capacitor C1 will oppose the blocking bias on the valve 8V supplied by the transformer T3a to permit valve 8V to conduct. Conduction of valve 8V completes the circuit from the anode of the valve 5V through the valve 8V through the closed contacts CR5a of the no-weld control relay CR5 to the igniter of the valve 5V whereby this valve 5V is rendered conductive to connect the transformer T1 between the lines L1 and L2. The secondary winding 70 of the transformer T7 not only is connected across the energizing winding of the relay CR4 but is also connected across a resistor 80 arranged in series circuit with the resistor R4b between the grid and cathode of the valve 9V. The polarity of this connection is such that with the transformer T7 energized the voltage across the resistor 80 combined with that across the resistor R4b will provide a conducting bias potential between the grid and cathode of the valve 9V whereby it will conduct during the subsequent half cycle to that in which the valve 5V conducted.

In this form of the invention the relay CR4 is provided with a pair of normally closed contacts CR4a and a pair of normally open contacts CR4b. The contacts CR4b are connected between the terminal 56 and the positive terminal 40 of the capacitor C1. The normally closed contacts CR4a are connected in the conductor 66 intermediate the resistor R11 and the contact 52 of the relay CR2. During standby periods of the network of Fig. 3, a circuit will be completed from the positive terminal 60 through the resistor R11, conductor 66, normally closed contacts CR4a, arm 50 to the positive terminal 40 of the capacitor C1 while the negative terminal 44 is continually connected to the negative bus 64 to maintain the capacitor C1 charged.

Upon initiation of a welding cycle, as described above, in connection with Fig. 1 and Fig. 2, the valve 2V will become conductive, energizing the relay CR2 and moving the arm 50 out of engagement with contact 52 and into engagement with contact 54 whereby the capacitor C1 commences to discharge through the resistors R6 through R8. The potential appearing across these resistors R6 to R8 overcomes the potential appearing across the resistor R4a whereby the valve 8V is rendered conductive for rendering the valve 5V conductive to energize the transformer T1. As explained above, the valve 9V will also be rendered conductive during the subsequent half cycle and the transformer T1 will be energized to energize the relay CR4.

The transformer T7 will be energized and energize the relay CR4 which opens its contacts CR4a and closes is contacts CR4b. Opening of the contacts CR4a is without immediate effect since the arm 50 is in engagement with the contact 54 and has already broken the circuit through the conductor 66 to the capacitor terminal 40. Closure of the contacts CR4b establishes a connection from the terminal 40 to the terminal 56 in by-pass relation with that established by the arm 50 and contact 54 so that upon timing out of the hold time network 28 and its consequent blocking of the valve 2V and opening of the relay CR2, the connection between terminals 40 and 56 will not be disturbed and firing of the valves 8V and 9V will remain under control of the capacitor C1.

While only three forms of the invention have been illustrated, it will be appreciated that various other modifications in the form and arrangement of the parts may be made without departing from the spirit and scope of the invention.

What is claimed and is desired to be secured by United States Letter Patent is as follows:

1. In an electronic sequencing network for controlling a plurality of operations, a first and a second electrical bus, a pair of terminals normally maintained energized from an alternating supply of electrical potential, means connecting said first bus to one of said terminals, a plurality of electric valves each having a pair of principal electrodes and a control electrode, means connecting one of said principal electrodes of a first of said valves to said first bus, a first relay having an energizing winding and two sets of normally open contacts, circuit means connecting another of said principal electrodes of said first valve through said winding to said second bus, means including one of said contact sets connecting the other of said terminals to said second bus, a normally open switch, means connecting said switch in parallel arrangement with said one contact set, a second relay having an energizing winding and a switch controlled in accordance with an energized condition of said last-named winding, means including said second relay winding connecting one of said principal electrodes of a second of said valves to said first bus, a fourth impedance element, means including said fourth impedance element connecting the other of said principal electrodes of said second valve to said first bus, means including the second set of said first relay contacts connecting said second valve other principal electrode to said second bus, a first impedance network including a chargeable element, means including said impedance network connecting one of said principal electrodes of a third of said valves to said first bus, circuit means connecting the other of said principal electrodes of said third valve to said second bus, a second impedance network including a chargeable element, means including said second impedance network connecting said third valve control electrode to said other terminal, a third impedance network including a chargeable element, means including said third impedance network connecting said second valve control electrode to said other terminal, circuit means connecting said third valve one principal electrode to said first valve control electrode, and means actuated as a consequence of the energization of said second relay for terminating flow of charging current to said second impedance network chargeable element.

2. In an electronic sequencing network for controlling a plurality of operations, a first and a second electrical bus, means normally maintaining said busses energized with an alternating supply of electrical potential, at least three impedance elements serially connected together and connected between said busses, a plurality of electric valves each having a pair of principal electrodes and a control electrode, means connecting one of said principal electrodes of a first of said valves to said first bus, a third electrical bus, a first relay having an energizing winding and two sets of normally open contacts, circuit means connecting another of said principal electrodes of said first valve through said winding to said third bus, means including one of said contact sets connecting said second bus to a third bus, a normally open switch, means connecting said switch in parallel arrangement with said one contact set, a second relay having an energizing winding and a switch controlled in accordance with an energized condition of said last-named winding, means including said second relay winding connecting one of said principal electrodes of a second of said valves to said first bus, a fourth impedance element, means including said fourth impedance element connecting the other of said principal electrodes of said second valve to said first bus, means including the second set of said first relay contacts connecting said second valve other principal electrode to said third bus, a first impedance network including a chargeable element, means including said impedance network and one of said three elements connecting one of said principal electrodes of a third of said valves to said first bus, circuit means connecting the other of said principal electrodes of said third valve to said third bus, a second impedance network including a chargeable element, means including another of said three elements and said second impedance network connecting said third valve control electrode to said second bus, a third impedance network including a chargeable element, means including said other of said three elements and said third impedance network connecting said second valve control electrode to said second bus, circuit means connecting said third valve one principal electrode to said first valve control electrode, and means actuated as a consequence of the energization of said second relay for terminating flow of charging current to said second impedance network chargeable element.

3. In an electronic sequencing network for controlling a plurality of operations, a first and a second electrical bus means normally maintaining said busses energized with an alternating supply of electrical potential, at least three impedance elements serially connected together and connected between said busses, a plurality of electric valves each having an anode and a cathode and a control electrode, means connecting said cathode of a first of said valves to said first bus, a third electrical bus, a first relay having an energizing winding and two sets of normally open contacts, circuit means connecting said anode of said first valve through said winding to said third bus, means including one of said contact sets connecting said second bus to said third bus, a normally open switch, means connecting said switch in parallel arrangement with said one contact set, a second relay having an energizing winding and a switch controlled in accordance with an energized condition of said last-named winding, means including said second relay winding connecting said anode of a second of said valves to said first bus, a fourth impedance element, means including said fourth impedance element connecting said cathode of said second valve to said first bus, means including the second set of said first relay contacts connecting said second valve cathode electrode to said third bus, a first impedance network including a capacitor and a resistor connected in parallel, means including said impedance network and the one of said three elements connected to said first bus for connecting said anode of a third of said valves to said first bus, circuit means connecting said cathode of said third valve to said third bus, a second impedance network including a capacitor and a resistor connected in parallel, means including the one of said three elements connected to said second bus and said second impedance network for connecting said third valve control electrode to said second bus, a third impedance network including a capacitor and a resistor connected in parallel, means including said last-named one of said three elements and said third impedance network connecting said second valve control electrode to said second bus, circuit means connecting said third valve anode to said first valve control electrode, and means responsive to the position of said second relay switch for terminating flow of charging current to said second impedance network chargeable element.

4. In an electronic sequencing network for controlling a plurality of operations, a first and a second electrical bus, means normally maintaining said busses energized with an alternating supply of electrical potential, at least three impedance elements serially connected together and connected between said busses, a plurality of electric valves each having a pair of principal electrodes and a control electrode, means connecting one of said principal electrodes of a first of said valves to said first bus, a third electrical bus, a first relay having an energizing winding and two sets of normally open contacts, circuit means connecting another of said principal electrodes of said first valve through said winding to said third bus, means including one of said contact sets connecting said second and third busses, a normally open switch, means connecting said switch in parallel arrangement with said one contact set, a second relay having an energizing winding and a switch having an arm engageable with a first contact at one energized condition of said last-named winding and engageable with a second contact at a second energized condition of said last-named winding, a chargeable device having a pair of terminals, a discharging circuit for said device including an impedance element and having a pair of terminals, a charging circuit for said device and having a pair of terminals, means connecting together one of said terminals of said device and said charging circuit and said discharging circuit, means connecting the other terminal of said device to said arm, means connecting the other of said charging circuit terminals to one of said contacts, means connecting the other of said discharging circuit terminals to the other of said contacts, a control circuit connected across at least a portion of said discharge circuit impedance element for controlling a sequencing step of said sequencing network, means including said second-relay winding connecting one of said principal electrodes of a second of said valves to said first bus, a fourth impedance element, means including said fourth impedance element connecting the other of said principal electrodes of said second valve to said first bus, means including the second set of said first relay contacts connecting said second valve other principal electrode to said third bus, a first impedance network including a chargeable element, means including said impedance network and one of said three elements connecting one of said principal electrodes of a third of said valves to said first bus, circuit means connecting the other of said principal electrodes of said third valve to said third bus, a second impedance network including a chargeable element, means including another of said three elements and said second impedance network connecting said third valve control electrode to said second bus, a third impedance network including a chargeable element, means including said other of said three elements and said third impedance network connecting said second valve control electrode to said second bus, circuit means connecting said third valve one principal electrode to said first valve control electrode, and means actuated as a consequence of the energization of said second relay for terminating flow of charging current to said second impedance network chargeable element.

5. In an electronic sequencing network for controlling a plurality of operations, a first and a second electrical bus, means normally maintaining said busses energized with an alternating supply of electrical potential, at least three impedance elements serially connected together and connected between said busses, a plurality of electric valves each having an anode and a cathode and a control electrode, means connecting said cathode of a first of said valves to said first bus, a third electrical bus, a first relay having an energizing winding and a set of normally open contacts, circuit means connecting said anode of said first valve through said winding to said third bus, a switch, means including said switch connecting said second bus to said third bus, a second relay having an energizing winding and a switch controlled in accordance with an energized condition of said last-named winding, means including said second relay winding connecting said anode of a second of said valves to said first bus, a fourth impedance element, means including said fourth impedance element connecting said cathode of said second valve to said first bus, means including said first relay contacts connecting said second valve cathode electrode to said third bus, a first impedance network including a capacitor and a resistor connected in parallel, means including said impedance network and the one of said three elements connected to said first bus for connecting said anode of a third of said valves to said first bus, circuit means connecting said cathode of said third valve to said third bus, a second impedance network including a capacitor and a resistor connected in parallel, means including the one of said three elements connected to said second bus and said second impedance network for connecting said third valve control electrode to said second bus, a third impedance network including a capacitor and a resistor connected in parallel, means including said last-named one of said three elements and said third impedance network connecting said second valve control electrode to said second bus, circuit means connecting said third valve anode to said first valve control electrode, said second relay being operable in one position to terminate the flow of charging current to said second impedance network chargeable element.

6. In an electronic sequencing network for controlling a plurality of operations, a first and a second electrical bus, means normally maintaining said busses energized with an alternating supply of electrical potential, at least three impedance elements serially connected together and connected between said busses, a plurality of electric valves each having an anode and a cathode and a control electrode, means connecting said cathode of a first of said valves to said first bus, a third electrical bus, a first relay having an energizing winding and two sets of normally open contacts, circuits means connecting said anode of said first valve through said winding to said third bus, means including one of said contact sets connecting said second bus to said third bus, a normally open switch, means connecting said switch in parallel arrangement with said one contact set, a second relay having an energizing winding and a normally open switch controlled in accordance with an energized condition of said last-named winding, means including said second relay winding connecting said anode of second of said valves to said first bus, a fourth impedance element, means including said fourth impedance element connecting said cathode of said second valve to said first bus, means including the second set of said first relay contacts connecting said second valve cathode electrode to said third bus, a first impedance network including a capacitor and a resistor connected in parallel, means including said impedance network and the one of said three elements connected to said first bus for connecting said anode of a third of said valves to said first bus, circuit means including said second relay switch connecting said cathode of said third valve to said third bus, a fifth impedance element, means including said fifth element connecting said third valve cathode to said first bus, a second impedance network including a capacitor and a resistor connected in parallel, means including the one of said three elements connected to said second bus and said second impedance network for connecting said third valve control electrode to said second bus, a third impedance network including a capacitor and a resistor connected in parallel, means including said last-named one of said three elements and said third impedance network connecting said second valve control electrode to said second bus, and circuit means connecting said third valve anode to said first valve control electrode.

7. In a timing network, an electronic valve having a pair of electrodes, a biasing circuit connected between said electrodes and including a first and a second potential establishing devices, potential means energizing said first device in a polarity to establish a bias potential between said electrodes of a polarity tending to render said valve non-conductive, an energy storage device, a charging circuit, switch means associated with said storage device and having a charging position in which said device is connected to said charging circuit for receiving energy therefrom and a discharging position in which said device is disconnected from said charging circuit and connected to energize said second potential establishing device in a polarity tending to render said valve conductive.

8. In a sequencing network for controlling the flow of electrical energy to a load, an energy flow controlling circuit having an energized condition in which energy is supplied to said load and a de-energized condition in which no energy is supplied to said load, said circuit including an electric valve having a pair of electrodes for controlling its conductivity, a discharging circuit including an impedance element, said impedance element being connected between said electrodes and effective upon energization to actuate said valve conductive to energize said load, an energy storage device, a charging circuit normally connected to supply energy to said storage device, switching means for rendering said charging circuit ineffective to supply energy to said storage device and thereafter rendering said storage device effective to energize said biasing circuit whereby the energy of said device discharges through said biasing circuit element to render said valve conductive.

9. In a timing network for controlling the flow of energy to a load, a pair of electronic valves, each said valve having a pair of electrodes, a biasing network connected between said electrodes of a first of said valves, said biasing network having a plurality of input terminals, a first potential supplying network including a discharging circuit connected to a pair of said terminals and arranged to energize said biasing network in a polarity tending to render said first valve into a first operating condition, an energy storage device, a charging circuit for said storage device, means normally maintaining said charging circuit effective to keep said storage device in a first charged condition and disconnected from said biasing network, said means being actuatable to render said charging circuit ineffective to charge said storage device and to connect said storage device to a pair of said terminals whereby said storage device is discharged through said discharge circuit and said biasing network is energized in a polarity tending to render said first valve into a second operating condition, load controlling means responsive to the rendering of said first valve into its said second condition to supply energy to said load, circuit means connecting said storage element between said electrodes of a second of said pair of valves whereby said second valve is normally maintained in a first operating condition, said second valve being rendered in a second operating condition as a consequence of the discharging of said storage device to a predetermined low charge, and means actuated by said second valve upon its being rendered in its second operating condition to render said load controlling means ineffective to supply said load circuit irrespective of said first valve.

10. In a sequencing network, a first electric valve having a pair of principal electrodes and a control electrode, an impedance network comprising an energy storage device and a discharge circuit therefor, means for energizing said network whereby said device is charged, circuit means connecting said network between one of said principal electrodes and said control electrode in a polarity which will hold said valve nonconductive when said device is charged, a relay having a winding and a single pole double throw switch, circuit means including said principal electrodes connecting said winding to a source of electrical energy, a chargeable device, a charging circuit for said device and including said switch, said switch being operable in one position to connect said chargeable device to said charging circuit for charging said chargeable device, a discharge circuit for said chargeable device and including said switch and an impedance element, said switch being operable in a second position to disconnect said chargeable device from said charging circuit and to connect said chargeable device to said impedance element whereby said chargeable device discharges therethrough, means connected across at least a portion of said impedance element and responsive to a potential appearing thereacross for controlling a sequenced function controlled by said sequencing work.

11. In a sequencing network, a first electric valve having a pair of principal electrodes and a control electrode, means for controlling the application of a control potential between one of said principal electrodes and said control electrode to control the conductivity of said valve, a relay having a winding and a single pole double throw switch, circuit means including said principal electrodes connecting said winding to a source of electrical energy, a chargeable device, a charging circuit for said device and including said switch, said switch being operable in one position to complete a circuit from said charging circuit to said chargeable device, a discharge circuit for said chargeable device and including said switch and an impedance element, said switch being operable in a second position to discontinue the application of charging current to said chargeable device and to connect said chargeable device for connecting the same to said discharge circuit whereby said chargeable device is operable to discharge therethrough, means connected across at least a portion of said impedance element and responsive to a potential appearing thereacross for controlling a sequenced function controlled by said sequencing network.

12. In a sequencing network, a first electric valve having a pair of principal electrodes, means for controlling the conductivity of said valve, a relay having a winding and a single pole double contact switch, circuit means including said principal electrodes connecting said winding to a source of electrical energy, a chargeable device having a first terminal thereof connected to said single pole of said switch, a charging circuit for said device and having one terminal connected to a second terminal of said device and a second terminal connected to one of said switch contacts, said switch being operable in one position to bring said pole into contact with said one switch contact for connecting said device to said charging circuit, a discharge circuit for said chargeable device including an impedance element and having one terminal connected to said device second terminal and a second terminal connected to a second of said switch contacts, said switch being operable in a second position to bring said pole out of contact with said one switch contact and into contact with said second switch contact for connecting said device to said impedance element whereby said chargeable device is operable to discharge therethrough, means connected across at least a portion of said impedance element and responsive to a potential appearing thereacross for controlling a sequenced function controlled by said sequencing network, a second single pole double contact switch interposed between said device first terminal and said first switch single pole, said second switch pole being connected to said device first terminal, one of said second switch contacts being connected to said first switch pole, said second switch second contact being connected to said first switch second contact, and means responsive to a condition of said sequenced function for actuating said second double contact switch.

13. In a sequencing network, a first electric valve having a pair of principal electrodes, means for controlling the conductivity of said valve, a relay having a winding and a single pole double contact switch, circuit means including said principal electrodes connecting said winding to a source of electrical energy, a chargeable device having a first terminal thereof connected to said single pole of said switch, a charging circuit for said device and having one terminal connected to a second terminal of said device and a second terminal connected to one of said switch contacts, said switch being operable in one position to bring said pole into contact with said one switch contact for connecting said device to said charging circuit, a discharge circuit for said chargeable device including an impedance element and having one terminal connected to said device second terminal and a second terminal connected to a second of said switch contacts, said switch being operable in a second position to bring said pole out of contact with said one switch contact and into contact with said second switch contact for connecting said device to said impedance element whereby said chargeable device is operable to discharge therethrough, means connected across at least a portion of said impedance element and responsive to a potential appearing thereacross for controlling a sequenced function controlled by said sequencing network, a second switch means arranged in series with said relay switch for disconnecting said charging circuit from said relay switch first contact, and means responsive to a condition of said sequenced function for actuating said second double contact switch.

14. In a timing device, a pair of terminals adapted to be supplied with alternating current, a plurality of electric valves, each said valve having an anode and a cathode and a control electrode, means including the energizing winding of a first relay connecting said anode of a first of said valves to a first of said terminals, means connecting said cathode of said first valve to a second of said terminals, means including the energizing winding of a second relay connecting said anode of a second of said valves to said second terminal, means including a pair of normally open contacts of said first relay connecting said cathode of said second valve to said first terminal, means including a control device connecting said anode of a third of said valves to said first terminal, means connecting said cathode of said second valve to said second terminal, means including an impedance network connecting said anode of a fourth of said valves to said second terminal, means including normally open contacts of said second relay connecting said cathode of said fourth valve to said first terminal, means including an impedance element connecting said cathode of said second valve to said second terminal, means including an impedance element connecting said cathode of said second terminal, means connecting said fourth valve anode to said control element of said first valve, means including an impedance network connecting said control electrode of said fourth valve to said first terminal, means including an impedance network connecting said control electrode of said second valve to said first terminal, an energy storage device, a charging circuit for said storage device and including normally closed contact of said second relay, a discharge circuit for said storage device and including an impedance element and normally open contact of said second relay, said relay being operable upon energization to open said last-named normally closed contact and thereafter to close said last-named normally open contact whereby charging of said storage device is terminated and discharging of said storage device is initiated through said discharge circuit to energize said discharge circuit impedance element, and circuit means connecting said discharge circuit impedance element between said cathode and said control electrode of said third valve.

15. In a timing network for controlling the time interval during which a device is actuated from a normal first operating condition to a temporary second operating condition, an electric valve having a pair of principal electrodes and a control electrode, a principal electrode circuit for said valve including control means actuated in response to current flow between said principal electrodes for actuating said device to its said second condition from its said first condition, a bias applying circuit connected between said control electrode and one of said principal electrodes, a potential supplying device connected in series in said bias circuit and polarized to provide a bias potential which when unopposed blocks said valve, means for continually maintaining said one potential device energized, an impedance element, an electrical energy storage component, a circuit for altering the magnitude of the energy stored in said electrical energy storage component and including said impedance element and a control switch, said switch acting upon closure to complete said last-named circuit to initiate current flow in said last-named circuit to cause a change in the quantity of energy stored in said electrical energy storage component, said last-named circuit being characterized by the fact that at least a portion of such current flows through said impedance element in a direction to provide a potential thereacross which is of a polarity opposite to that of said potential supplying device.

16. In a timing network for controlling the time interval during which a device is actuated from a normal first operating condition to a temporary second operating condition, an electric valve having a pair of principal electrodes and a control electrode, a principal electrode circuit for said valve including control means actuated in response to current flow between said principal electrodes for actuating said device to its said second condition from its said first condition, a bias applying circuit connected between said control electrode and one of said principal electrodes, a potential supplying device connected in series in said bias circuit and polarized to provide a bias potential which when unopposed blocks said valve, means for continually maintaining said one potential device energized, a resistor connected in series with said potential device, a capacitor, a circuit for altering the magnitude of the energy stored in said capacitor and including said resistor and a control switch, said switch acting upon closure to complete said last-named circuit to initiate current flow in said last-named circuit to cause a change in the quantity of energy stored in said capacitor, said last-named circuit being characterized by the fact that at least a portion of said current flows through said resistor in a direction to provide a potential thereacross which is of a polarity opposite to that of said potential supplying device.

17. In a timing network for controlling the time interval during which a device is actuated from a normal first operating condition to a temporary second operating condition, an electric valve having a pair of principal electrodes and a control electrode, a principal electrode circuit for said valve including control means actuated in response to current flow between said principal electrodes for actuating said device into its said second condition from its said first condition, a bias applying circuit connected between said control electrode and one of said principal electrodes, a pair of energizable potential producing devices connected in series in said bias circuit, one of said potential devices being polarized to provide a bias potential to block said valve, an electrical energy storage component, circuit means connecting the other of said potential devices with said storage component whereby the flow of current resulting from a change in the magnitude of the energy stored in said component energizes said other potential device, said other potential device being polarized oppositely to said one potential device and effective, during at least a portion of such current flow, to render said valve conducting.

18. In a timing network for controlling the time interval during which a device is actuated from a normal first operating condition to a temporary second operating condition, an electric valve having a pair of principal electrodes and a control electrode, a principal electrode circuit for said valve including control means actuated in response to current flow between said principal electrodes for actuating said device to its said second condition from its said first condition, a bias applying circuit connected between said control electrode and one of said principal electrodes, a potential device connected in said bias circuit, said potential device being polarized to provide a bias potential to block said valve, means for continually maintaining said potential device energized, an impedance element connected in series with said potential device, an electrical energy storage component, circuit means connecting said impedance element in series circuit with said storage component whereby the flow of current consequent to a change in the magnitude of the energy stored in said component flows through said impedance element, the directions of current flow through said impedance element being such that the potential appearing across said element is opposite to that of said potential device and of sufficient magnitude, during at least a portion of the time said current flows, to render said valve conducting.

19. In a timing network for controlling the operation of a device which is changed from a normal first operating condition to a temporary second operating condition and thereafter returned to said first condition, an electric valve having a pair of principal electrodes and a control electrode, a principal electrode circuit for said valve including control means actuated in response to current flow between said principal electrodes for actuating said device from its said first to its said second condition, a bias applying circuit connected between said control electrode and one of said main electrodes and including a first potential supplying element polarized to provide a bias potential which, when unopposed, maintains said valve in a normal non-conducting condition, said bias circuit including a second potential applying element polarized to supply a potential in said bias circuit in opposite polarity to that of said first element, an energy storage device connected to said second potential element to provide for energization of said second potential supplying element by the flow of current requisite to change the charged condition of said device, and means for controlling the initiation of said change in the charged condition of said device.

20. The combination of claim 19 in which there is provided a switch means having two circuit making positions, said switch means when in a first of said positions acting to connect said storage device to a source of charging energy for increasing the magnitude of energy stored in said device, said switch means when in the second of said positions acting to terminate the flow of energy to said device from said source and permit a reduction in the magnitude of the energy stored in said device, said switch means when in one of said positions connecting said second potential element for energization by the current flow requisite to changing the magnitude of the energy stored in said device, said switch means when in the other of said positions permitting the flow of current requisite to changing the magnitude of the energy stored in said device in a path which excludes said second potential element.

21. The combination of claim 20 in which said one and said second switch positions are the same whereby said second potential element is energized by the current flowing as a consequence of a reduction in the magnitude of the energy stored in said device.

22. In a timing system for controlling the operation of a device which is changed from a normal first operating condition to a temporary second operating condition and thereafter returned to said first condition, an electric valve having a pair of principal electrodes and a control electrode, a principal electrode circuit for said valve including control means actuated in response to current flow between said principal electrodes for actuating said device from its said first to its said second condition, a bias network having a pair of input terminals adapted to be connected to a source of electrical energy and having an output circuit connected between said control electrode and one of said main electrodes, said network including a first potential supplying element polarized to provide a bias potential which, when unopposed, maintains said valve in a non-conducting condition, said network also including a resistor and a capacitor and a switching device, said switching device having first and second operating conditions, said switching device when in said first condition acting to connect said impedance element across said input terminal to provide a flow of current to charge said capacitor and when in said condition to disconnect said capacitor from at least one of said input terminals to prepare said capacitor for the discharge of energy therefrom, said resistor being in series circuit relation with said capacitor at one of said switch means conditions whereby the current flow during said one condition is through said resistor in a first direction, said resistor being arranged to supply a potential, during current flow in said first direction, to establish a polarity opposite to that of said first element.

23. In an electrical timing system for controlling the interval energization of a control apparatus, electric valve means having a pair of control electrodes controlling its conductive condition, a potential supplying network having an output circuit connected across said electrodes, a first potential supplying component in said network and polarized to maintain said valve means in a non-conducting condition, a second selectively energized potential supplying component in said network and polarized to render said valve means in a conducting condition, an electrical device for supplying a predetermined quantity of electrical energy to said second component, and a control device for rendering said supply device effective to supply said quantity of energy to said second component, said second component being effective, during at least a portion of the time said energy is being supplied to said second component, to dominate said first component to provide for conduction of said valve means during said interval.

24. The combination of claim 23 in which said second potential component is a resistor connected in series circuit relation with said first potential component, said device is a capacitor, and in which there is provided means for preventing a flow of charging current to said capacitor subsequent to the initiation of its discharge through said resistor.

25. In a control circuit for controlling operations of electric resistance welding apparatus of the type having electrodes and a weld contactor for controlling the flow of weld current to said electrodes, the combination of switching means operative when energized to energize said contactor, means to energize said switching means including a gaseous discharge device, said device having a main electrode and a control electrode, a bias circuit connected between said electrodes and including means normally maintaining a first bias voltage therebetween which holds said device nonconductive, said bias circuit further including means to provide a second bias voltage in opposite polarity to said first voltage to overcome at least a portion of said first voltage to render said device conductive, said last-mentioned means including normally open contacts of a relay, a second gaseous discharge device, a source of electric potential, a normally open initiating switch operative when closed to connect said second discharge device to said source, said relay being associated with said second discharge device whereby conduction in the latter causes energization of the former, means including a time constant network extending to render said second discharge device nonconducting when said switch is closed and effective at the end of a predetermined time interval subsequent to closure of said switch to render said second discharge device conducting.

26. The combination of claim 25 in which there is provided means actuated as a consequence of the energization of said relay to maintain said first discharge device conductive.

27. In a control circuit for controlling operations of electric resistance welding apparatus of the type having electrodes and a weld contactor for controlling the flow of weld current to said electrodes, the combination of switching means operative when energized to energize said contactor, means to energize said switching means including a gaseous discharge device, said device having a main electrode and a control electrode, a bias circuit connected between said electrodes and including means normally maintaining a first bias voltage therebetween which holds said device nonconductive, an energy storage device which when energized provides a second bias voltage, a source of charging potential for said storage device, a relay for connecting said storage device to said source and to said bias circuit and normally maintained in a first position to connect said storage device to said source, said relay having a second position for connecting said storage device to said bias circuit, a second gaseous discharge device for controlling the operation of said relay and normally maintained in a condition to hold said relay in its said first condition, an initiating switch operative when actuated to actuate said second discharge device whereby it places said relay in its said second condition, said storage device being effective when connected into said bias circuit to overcome at least a portion of said first voltage to render said first discharge device conductive.

28. In a control circuit for controlling operations of electric resistance welding apparatus of the type having electrodes and a weld contactor for controlling the flow of weld current to said electrodes, the combination of switching means operative when energized to energize said contactor, means to energize said switching means including a gaseous discharge device, said device having a main electrode and a control electrode, a bias circuit connected between said electrodes and including means normally maintaining a first bias voltage therebetween which holds said device nonconductive, an energy storage device which when energized provides a second bias voltage, a source of charging potential for said storage device, a relay for connecting said storage device to said source and to said bias circuit and normally maintained in a first position to connect said storage device to said source, said relay having a second position for connecting said storage device to said bias circuit, a second gaseous discharge device for controlling the operation of said relay and normally maintained in a condition to hold said relay in its said first condition, an initiating switch operative when actuated to actuate said second discharge device whereby it places said relay in its said second condition, said storage device being effective when connected into said bias circuit to overcome at least a portion of said first voltage to render said first discharge device conductive, and means including a time constant network to hold said second discharge device in its said normal condition and effective at the end of a predetermined time interval subsequent to actuation of said switch to render said second discharge device effective to place said relay in its said second condition.

29. The combination of claim 27 in which there is provided a second switching means rendered effective as a consequence of the rendering of said first discharge device conductive to maintain said storage device connected to said bias circuit and disconnected from said source throughout the period in which said storage device is effective to maintain said first discharge device conductive.

30. The combination of claim 29 in which said second switching means is a relay having an energizing winding, and means for energizing said winding as a consequence of the flow of said weld current.

31. The combination of claim 27 in which said bias circuit is provided with a discharge circuit and in which said relay in its said second condition connects said storage device to said discharge circuit.

32. In a control circuit for controlling operations of electric resistance welding apparatus of the type having electrodes and a weld contactor for controlling the flow of weld current to said electrodes, the combination of switching means operative when energized to energize said contactor, a gaseous discharge device connected to control the energization of said switching means and having a pair of electrodes, a bias circuit connected between said electrodes and including means normally maintaining a first bias voltage between said electrodes which holds said device nonconductive, said bias circuit further including a resistor, a capacitor, a source of charging voltage for said capacitor, a first relay having a movable member operable in a first position to connect said capacitor to said source and to disconnect it from said bias circuit, said movable member being operable in a second position to disconnect said capacitor from said source and to connect it to discharge through said resistor in a direction to establish a potential in said resistor which opposes said first bias voltage whereby said discharge device is rendered conductive for a desired time interval.

33. The combination of claim 32 in which there is provided a second relay connected in circuit with said first relay and operable in a first condition to render said first relay effective and in a second condition to render said first relay ineffective, said second relay when in said second condition connecting said capacitor to said resistor irrespective of said first relay.

34. The combination of claim 33 in which said second relay is normally maintained in its said first condition, said second relay being provided with a control element, means connecting said control element to be energized as a consequence of the flow of said weld current whereby said second relay is placed in its said second condition.

35. In a control circuit, a discharge device having a pair of principal electrodes and a control electrode, a load circuit including said principal electrodes, a bias circuit connected between said control electrode and one of said principal electrodes, said bias circuit comprising a pair of series connected electrical elements, means normally maintaining a first potential across one of said elements and of a polarity and magnitude such that when said first potential is acting alone said device is held nonconducting, an energy storage component, a source of charging potential for said component, a first switching device for selectively connecting said storage component to either said source or to the other of said electrical elements and having a normal condition in which said storage component is connected to said source but not to said other element and an actuated condition in which said storage component is connected to said other electrical element but not to said source.

36. The combination of claim 35 in which said other electrical element comprises a discharge path for said storage component.

37. The combination of claim 35 in which said switching device is so constructed and arranged that it disconnects said storage component prior to connecting said storage component to said other element.

38. The combination of claim 35 in which there is provided a second switching device connected in series circuit with said first switching device and effective in a first condition to render said first switching device effective, said second switching device being effective in a second condition to render said first switching device ineffective to connect said storage component to said source, and to connect said storage component to said other electrical element irrespective of said first switching device.

39. The combination of claim 38 in which said second switching device is provided with means for actuating it from its said first to its said second condition, and means connecting said last-named means for actuation as a consequence of the conduction of said discharge device.

40. In a control circuit for an electronic discharge device having a pair of controlling electrodes, a first contact for connection with one of said electrodes, a second contact for connection with the other of said electrodes, a circuit connecting said contacts and including a pair of series connected electrical components, means for continually energizing one of said components in a first polarity to impress a bias between said contacts, an energy storage component, a charging circuit for said storage component, and switch means operable in a first condition to render said charging circuit effective to charge said storage component, said switch means being operable in a second condition to render said charging circuit ineffective to charge said storage component and to render said storage component effective to energize the other of said series connected electrical components to a polarity opposing said first polarity.

41. In a control circuit for electric resistance welding apparatus of the type having a weld contactor adapted to control the flow of weld current the combination of a source of pulsating power, a gaseous discharge device having an anode, cathode and control grid, said anode and cathode being connected to said power source, switching means for controlling the application of anode-cathode potential to said discharge device, a control grid circuit for said discharge device including a capacitor-potentiometer time constant network, means to charge said capacitor, switching means for said control grid circuit having normally closed contacts connecting said capacitor with said charging means, and normally open contacts connecting said capacitor with said grid, the arrangement being such that when said normally open contacts are closed a positive control grid signal is placed on said discharge device to cause conduction therein, means associated with said grid circuit operative when said switching means is energized to place a negative grid bias on said discharge device, said positive signal being initially of greater magnitude than said negative bias, switching means associated with said discharge device operative in response to conduction therein to energize said weld contactor.

42. In a control circuit for controlling a plurality of sequentially related operations of a welding machine of the type having electrodes, means to move said electrodes, and a contactor for controlling the flow of weld current to said electrodes; the combination of an alternating current power source, a first grid-controlled gaseous discharge device connected to said power source, a switch for energizing said first discharge device, a first switching relay adapted to be energized in response to conduction in said first discharge device, said means to move being operative upon energization of said relay to move said electrodes into contact with workpieces to be welded, a second gaseous discharge device connected to said power source through normally open contacts of said first relay, said second discharge device being connected in anti-parallel relation to said first discharge device, a control grid circuit for said second discharge device including a capacitor-potentiometer time constant network, means operative prior to energization of said first relay to charge said capacitor whereby a negative grid signal is placed on said second discharge device to maintain the same nonconductive, the arrangement being such that said capacitor will begin to discharge upon energization of said first relay to render said second discharge device conductive a predetermined time thereafter, a second relay adapted to be energized in response to conduction in said second discharge device, a third gaseous discharge device connected to said source through normally open contacts of said first relay, a control grid circuit for said third discharge device including a capacitor-potentiometer time constant network, said last mentioned network including normally open contacts of said second relay, means for charging said capacitor whereby when said last mentioned normally open contacts are closed a positive grid signal is placed on said third discharge device to render the same conductive, said charging means including normally closed contacts of said second relay, a third switching relay adapted to be energized in response to conduction in said third discharge device, means responsive to the energization of said last mentioned relay to energize said contactor, a fourth gaseous discharge device connected to said power source in parallel relation to said third discharge device, a grid circuit for said last mentioned discharge device including means operative in response to conduction in a prior to be actuated one of said discharge devices to place a positive grid signal on said fourth discharge device and means operative during conduction in said second discharge device to place an opposing negative signal on said fourth discharge device, said last mentioned positive signal being of greater magnitude than said opposing negative signal, a capacitor-potentiometer time constant network connected in series with the anode-cathode circuit of said fourth discharge device, a fifth gaseous discharge device connected to said source through normally open contacts of said first relay, said fifth discharge device being connected in anti-parallel relation to said fourth discharge device, a control grid circuit for said fifth discharge device including conductor means connected to said last mentioned time constant network, the arrangement being such that when said fourth discharge device is conducting and for a predetermined time thereafter a negative grid signal is placed on said fifth discharge device to render the same nonconductive, and a control grid circuit for said first discharge device including conductor means connected to the anode of said fifth discharge device whereby a negative grid signal is placed on said first discharge device when said fifth discharge device is conducting.

43. In a control circuit for timing a plurality of sequentially related operations the combination of a power source, a first gaseous discharge device connected to said source, a switch for energizing said first discharge device, a switching relay adapted to be energized in response to conduction in said first discharge device, a second gaseous discharge device connected to said source through normally open contacts of said first relay, said second discharge device being connected in anti-parallel with said first discharge device, a control grid circuit for said second discharge device including a capacitor-potentiometer time constant network, means for charging said capacitor while said first relay is deenergized whereby a negative grid signal is placed on said second discharge device, a second switching relay adapted to be energized in response to conduction in said second discharge device, a third gaseous discharge device connected to said source through normally open contacts of one of said relays, a grid circuit for said third discharge device including a capacitor-potentiometer time constant network and normally open contacts of said second relay, means to charge said last mentioned capacitor including normally closed contacts of said second relay, the arrangement being such that when said last mentioned normally open contacts are closed a positive control grid signal is placed on said third discharge device, means associated with said last mentioned grid circuit and operative when said second discharge device is conducting to place a negative control grid bias on said third discharge device, said positive signal being initially of greater magnitude than said negative bias, and means rendered effective with the cessation of conduction in said third discharge device and operative a predetermined time thereafter to terminate conduction in said first discharge device.

44. In a control circuit for welding apparatus of the type having electrodes movable toward and away from work pieces and a weld contactor for controlling the flow of weld current, the combination of a power source, a switching relay, means for energizing said relay, a first gaseous discharge device connected to said source through normally open contacts of said relay, means associated with said relay operative upon energization thereof to cause said electrodes to move into contact with said workpieces, a grid control circuit for said first discharge device including a capacitor-potentiometer time constant network, means associated with said source and said time constant network adapted to charge said capacitor when said relay is deenergized whereby a negative grid signal is placed on said first discharge device, the arrangement being such that said charging means are rendered ineffective upon energization of said relay whereby said capacitor is discharged to render said first discharge device conductive a predetermined time subsequent to energization of said relay, a second switching relay adapted to be energized in response to conduction in said first discharge device, a second gaseous discharge device connected to said source through normally open contacts of one of said relays, switching means operative in response to conduction in said second discharge device to energize said weld contactor, a control grid circuit for said second discharge device including a capacitor-potentiometer time constant circuit and normally open contacts of said second relay, charging means for said last mentioned capacitor including normally closed contacts of said second relay, the arrangement being such that when said second relay is energized a positive control grid signal is placed on said second discharge device, means associated with said last mentioned control grid circuit and operative during conduction in said first discharge device to place a negative control grid bias on said second discharge device, said positive signal being initially of greater magnitude than said negative bias, and means rendered effective with the termination of conduction in said second discharge device and operative a predetermined time thereafter to deenergize said first relay.

45. Apparatus according to claim 44 further characterized by said means responsive to the termination of conduction in said second discharge device comprising a third gaseous discharge device connected to said source, means associated with said third discharge device operative during conduction in said first discharge device to place a negative grid bias on said third discharge device, means associated with said second and third discharge devices operative during conduction in said second discharge device to place a positive grid signal on said third discharge device, said positive grid signal being of greater magnitude than said negative grid bias, and means associated with said third discharge device and said first relay operative in response to termination of conduction in said third discharge device to deenergize said first relay a predetermined time thereafter.

46. Apparatus according to claim 41 further including a second discharge device connected to said source, means to energize said second discharge device and said switching means for controlling the application of anode-cathode potential to said first mentioned discharge device and said means to place a negative grid bias upon said first mentioned discharge device being operative during conduction in said second discharge device.

47. In a control circuit for electric resistance welding apparatus of the type having electrodes movable toward and away from workpieces and a weld contactor for controlling the flow of weld current, the combination of a source of power, means to cause said electrodes to move into contact with said workpieces, said means including a first gaseous discharge device, a second gaseous discharge device connected to said power source and adapted to be energized a predetermined time after movement of said electrodes into contact with said workpieces, a third gaseous discharge device having an anode, cathode and grid, said anode and cathode being connected to said source, a grid circuit for said third discharge device having a resistance member therein and a capacitor connectable into and out of said circuit in parallel with said resistance member, switching means operative in response to conduction in said second discharge device to connect said capacitor into said grid circuit, charging means for said capacitor, switching means normally connecting said capacitor to said charging means operative in response to conduction in said second discharge device to disconnect said charging means, the arrangement being such that said capacitor when charged and connected in said grid circuit will render said third discharge device conductive for a predetermined time interval wherein said capacitor discharges through said resistance member, and means effective during conduction in said second discharge device for applying a blocking control bias to said third discharge device, said blocking bias being operative to extinguish said third discharge device after said predetermined time interval.

48. In a timing circuit for electric resistance welding apparatus of the type having a weld contactor for controlling the flow of welding energy the combination of a gaseous discharge device of the type having an anode, cathode and control grid, a source of alternating current power connecting said anode and cathode, a grid circuit for applying a control signal on said discharge device including a resistance member and a capacitor associated in parallel with said resistance member, charging means for said capacitor, switching means in said grid circuit having normally open and normally closed contacts, said charging means being connected to said capacitor through said normally closed contacts said capacitor being connected to said resistance member through said normally open contacts, the arrangement being such that said capacitor when charged and connected to said resistance member will render said discharge device conductive for a predetermined time wherein said capacitor discharges through said resistance member, and means operative during energization of said switching means to apply a blocking control bias to said discharge device, said blocking bias being operative to extinguish said discharge device after said predetermined time interval.

References Cited in the file of this patent
UNITED STATES PATENTS 2,484,575     Livingston _______________ Oct. 11, 1949